J. F. Seiberling.

Harvester Dropper.

No. 1698. Reissued June 11 1864

John F. Seiberling
by
Daniel Reed Atty

E. Bruce
A. Bruce

UNITED STATES PATENT OFFICE.

JOHN F. SEIBERLING, OF DOYLESTOWN, OHIO.

IMPROVEMENT IN HARVESTERS.

Specification forming part of Letters Patent No. 33,496, dated October 15, 1861; Reissue No. 1,698, dated June 14, 1864.

DIVISION A.

*To all whom it may concern:*

Be it known that I, JOHN F. SEIBERLING, of Doylestown, in the county of Wayne and State of Ohio, have invented new and useful Improvements in Harvesters; and I do hereby declare that the following is a full and exact description thereof, reference being had to the accompanying drawings, and to the letters of reference marked thereon.

It is very difficult to throw the gavel from the dropping platform of harvesters without entangling either the completed gavel or the accumulating grain. The object of my invention is to overcome this difficulty in a more simple and efficient manner than has been heretofore done. In order to accomplish this object it is necessary to arrest the fall of the accumulating cut grain upon the platform and at the same moment to drop the platform. For this purpose I have combined a cut-off with a dropping platform; but I do not herein claim the peculiar construction of said platform, nor the particular means employed for operating the same, as I propose to cover such features by separate patents.

The devices may be somewhat varied without departing from the principles of my within invention. Therefore I do not confine my claims to the precise devices herein described, which serve as one means of producing the result I have attained.

My invention consists in discharging the completed gavel by dropping the rear end of platform simultaneously with arresting the accumulation of the grain thereon, substantially as herein described.

Figure 2:
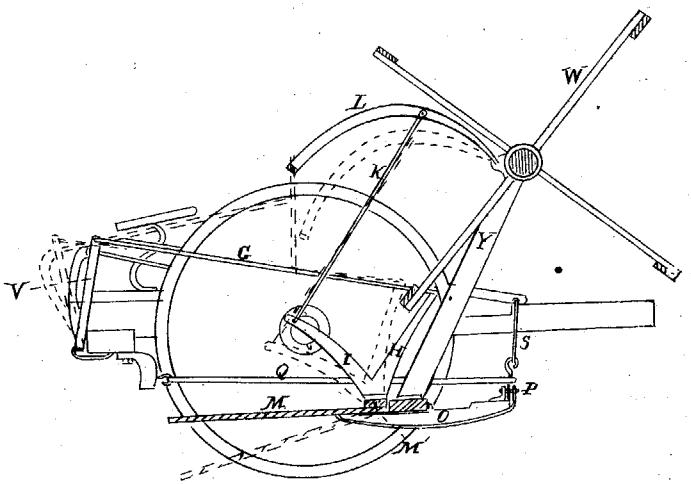
Figure 1:
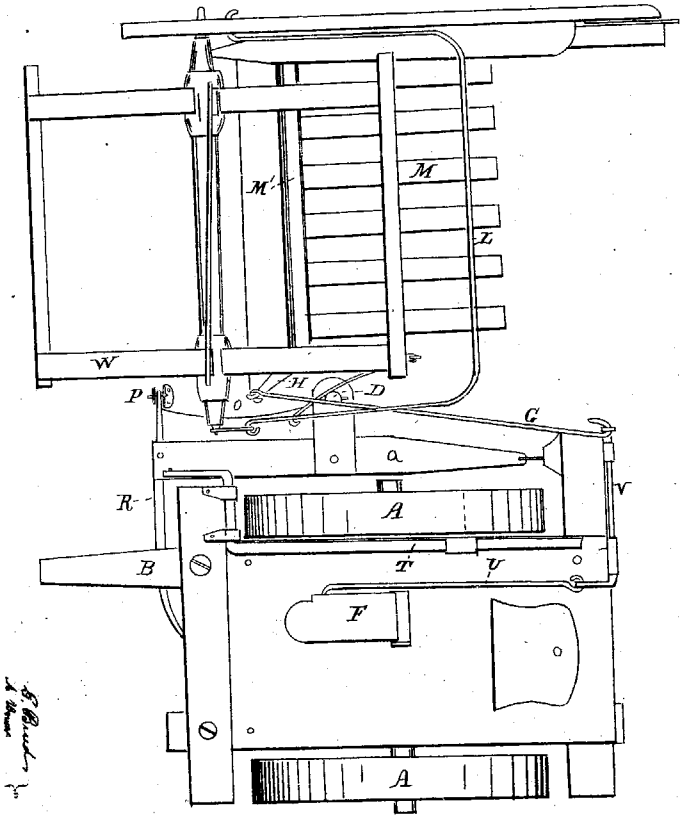

In the accompanying drawings, Figure 1 is a top view of my harvester. Fig. 2 is a vertical and longitudinal section of the same, the section being made through the fingered dropper and reel. The motion of the dropper is shown in red lines.

The dropper is shown as consisting of the rock-shaft M′ and the series of fingers M. A lever, H, is attached to the rock-shaft and connected by rod G to the elbow-lever V, which is in turn connected by rod U to the treadle F. By this arrangement the driver can suddenly throw down the fingers M, as seen in red lines, Fig. 2, or raise the same at pleasure. Another lever, I, also connected with the rock-shaft M′, is moved simultaneously with lever H, and by means of rod K is made to operate the cut-off L. This cut-off, when up, rides clear of the grain, but when let fall it receives the falling grain, and thus holds the latter until the gavel drops and the machine moves the length of the straw. When the fingers M are raised the same movement raises the cut-off, and the grain falls upon the dropper. These two operations are performed so suddenly that the gavel is thrown off without being entangled, and the now accumulating grain is easily held by the cut-off until the fingers M return to receive the gathered grain.

Having thus fully described my invention, what I claim, and desire to secure by Letters Patent of the United States, is—

1. Discharging the completed gavel by dropping the rear end of the platform simultaneously with arresting the accumulation of the grain thereon, substantially as and for the purposes set forth.

2. The combination of the cut-off L with a dropping or tilting platform, for the purpose of arresting the fall of the accumulating grain while discharging the completed gavel, substantially as described.

JOHN F. SEIBERLING.

Witnesses:
AMOS HENRICKS,
ABRAHAM B. CAPP.